United States Patent
Lee et al.

(10) Patent No.: US 12,427,536 B2
(45) Date of Patent: Sep. 30, 2025

(54) CATHODE MATERIAL INTEGRATED PROCESSING DEVICE

(71) Applicant: DAE SUNG MACHINERY CO., LTD., Siheung-si (KR)

(72) Inventors: Sung Min Lee, Suwon-si (KR); Hee Sung Lee, Ansan-si (KR); Chul U Bak, Siheung-si (KR)

(73) Assignees: DAE SUNG MACHINERY CO., LTD., Siheung-si (KR); ECOPRO BM CO., LTD., Cheongju-si (KR)

( * ) Notice: Subject to any disclaimer, the term of this patent is extended or adjusted under 35 U.S.C. 154(b) by 484 days.

(21) Appl. No.: 18/086,790

(22) Filed: Dec. 22, 2022

(65) Prior Publication Data
US 2023/0278060 A1    Sep. 7, 2023

(30) Foreign Application Priority Data

Mar. 4, 2022    (KR) .......................... 10-2022-0027857

(51) Int. Cl.
*B05B 15/25*    (2018.01)
*B05B 9/00*    (2006.01)
(Continued)

(52) U.S. Cl.
CPC .............. *B05B 15/25* (2018.02); *B05B 9/002* (2013.01); *B05C 5/02* (2013.01); *F26B 3/20* (2013.01);
(Continued)

(58) Field of Classification Search
None
See application file for complete search history.

(56) References Cited

U.S. PATENT DOCUMENTS

| 2,256,281 A | * | 9/1941 | Finley ................... E01C 19/105 366/24 |
| 4,556,175 A | | 12/1985 | Motoyama et al. |

(Continued)

FOREIGN PATENT DOCUMENTS

| CN | 210862056 | 6/2020 |
| EP | 3412360 | 12/2018 |

(Continued)

OTHER PUBLICATIONS

EPO, Search Report of EP 22213926.3 dated Aug. 9, 2023.

*Primary Examiner* — Jethro M. Pence
(74) *Attorney, Agent, or Firm* — LEX IP MEISTER, PLLC

(57) ABSTRACT

A cathode material integrated processing device, which dries, applies, and heat-treats a cathode material, according to an embodiment of the invention includes a support frame, a chamber part including a cylindrical body configured to accommodate the cathode material and a thick plate coupled to each of both ends of the cylindrical body to seal both the ends of the cylindrical body and configured to fix the cylindrical body to an upper portion of the support frame, a heating part disposed in close proximity to each of the outside the cylindrical body and the outside the thick plate of the chamber part to heat the chamber part, a spray part including one or more nozzles, which is disposed between an upper portion and one side of the cylindrical body of the chamber part and is inserted in a longitudinal direction of the cylindrical body to spray a coating liquid to the cathode material within the chamber part through a gas, a stirring part rotatably disposed inside the cylindrical body of the chamber part to stir the cathode material within the chamber part, a driving part connected to one side of the stirring part and rotatably disposed at one side of an upper portion of the support frame to rotate the stirring part, and a control part configured to control the heating part, the spray part, and the driving part.

16 Claims, 8 Drawing Sheets

(51) Int. Cl.
  *B05C 5/02*   (2006.01)
  *F26B 3/20*   (2006.01)
  *F26B 9/08*   (2006.01)
  *F26B 25/04*  (2006.01)
  *F26B 25/06*  (2006.01)
  *H01M 4/04*   (2006.01)

(52) U.S. Cl.
  CPC .............. *F26B 9/082* (2013.01); *F26B 25/04* (2013.01); *F26B 25/06* (2013.01); *H01M 4/0419* (2013.01); *H01M 4/0471* (2013.01)

(56) References Cited

U.S. PATENT DOCUMENTS

| | | | | |
|---|---|---|---|---|
| 5,038,709 | A * | 8/1991 | Yamada | B01J 2/003 425/222 |
| 11,930,835 | B1 * | 3/2024 | Nguyen | F26B 5/06 |
| 2008/0193632 | A1 * | 8/2008 | O'Hara | B01J 2/006 118/712 |
| 2010/0092652 | A1 * | 4/2010 | Ogura | C05F 9/02 71/14 |
| 2023/0013608 | A1 * | 1/2023 | Hellenes | F26B 11/16 |
| 2023/0278052 | A1 * | 9/2023 | Lee | F26B 25/06 118/64 |
| 2023/0278060 | A1 * | 9/2023 | Lee | H01M 4/0419 118/708 |

FOREIGN PATENT DOCUMENTS

| | | |
|---|---|---|
| JP | 2002255562 | 9/2002 |
| JP | 2006-274201 | 10/2006 |
| JP | 2017131836 | 8/2017 |
| KR | 10-2018-0074430 | 7/2018 |
| KR | 10-2020-0107727 | 9/2020 |
| WO | 03051505 | 6/2003 |
| WO | 2012176903 | 12/2012 |

* cited by examiner

[FIG.1]
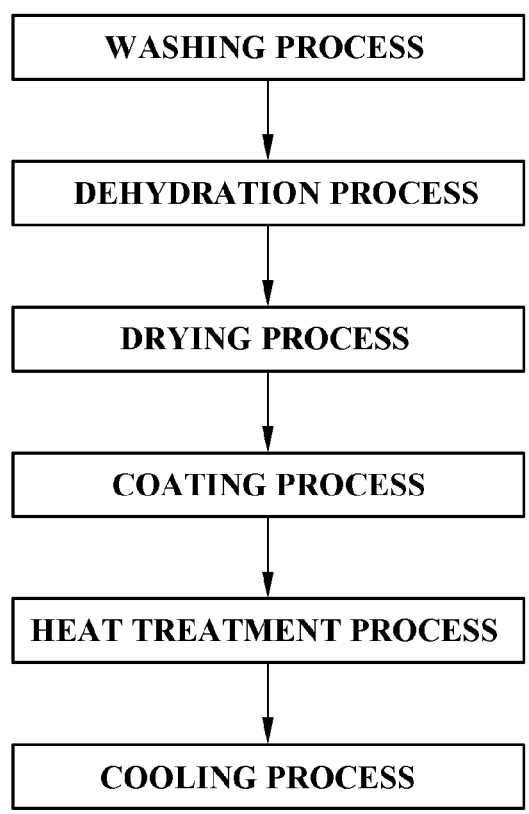

[FIG.2]
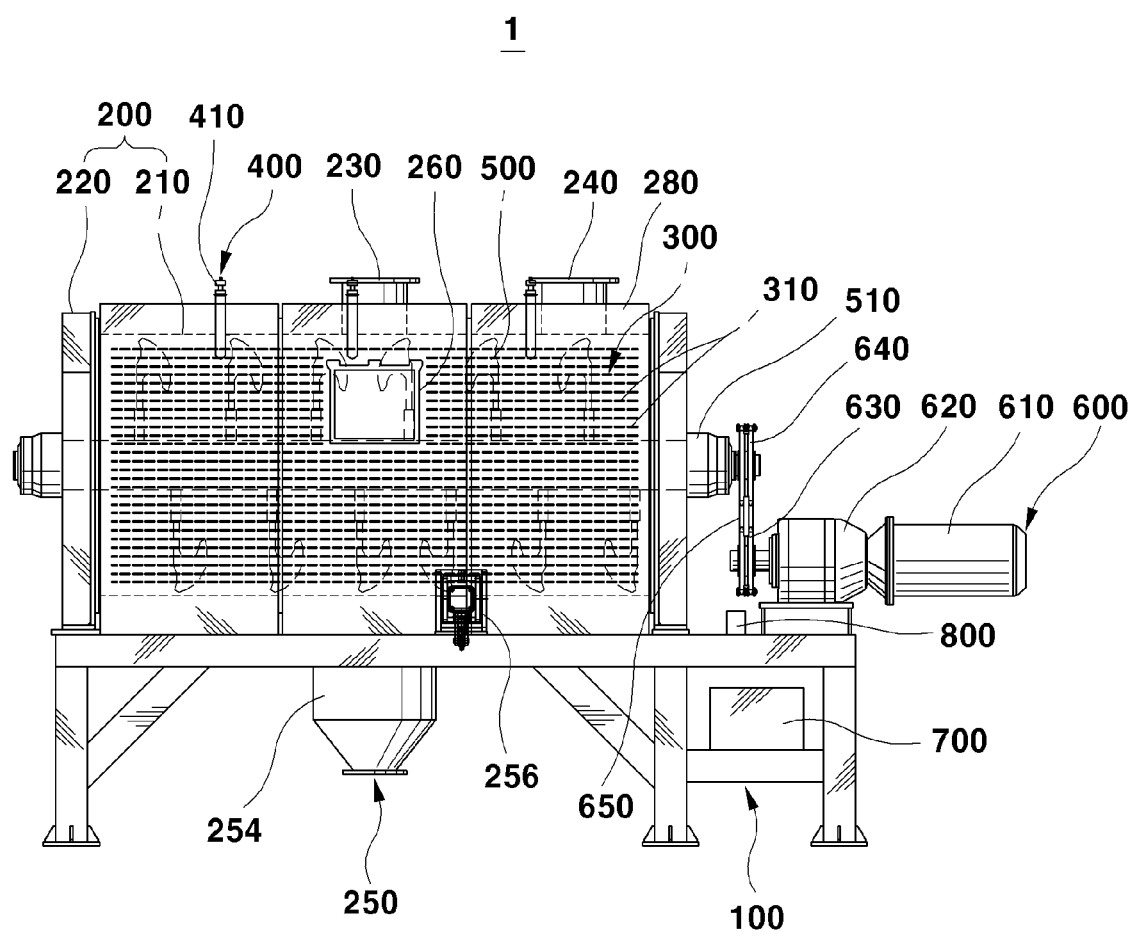

[FIG.3]
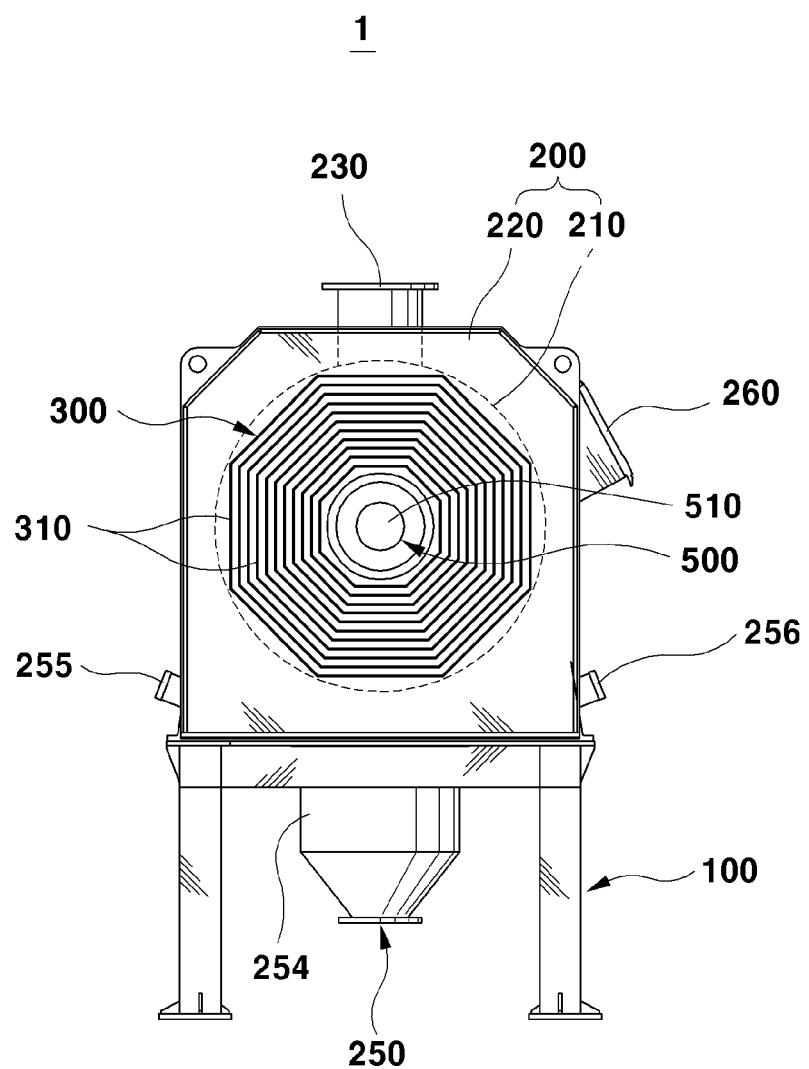

[FIG.4]
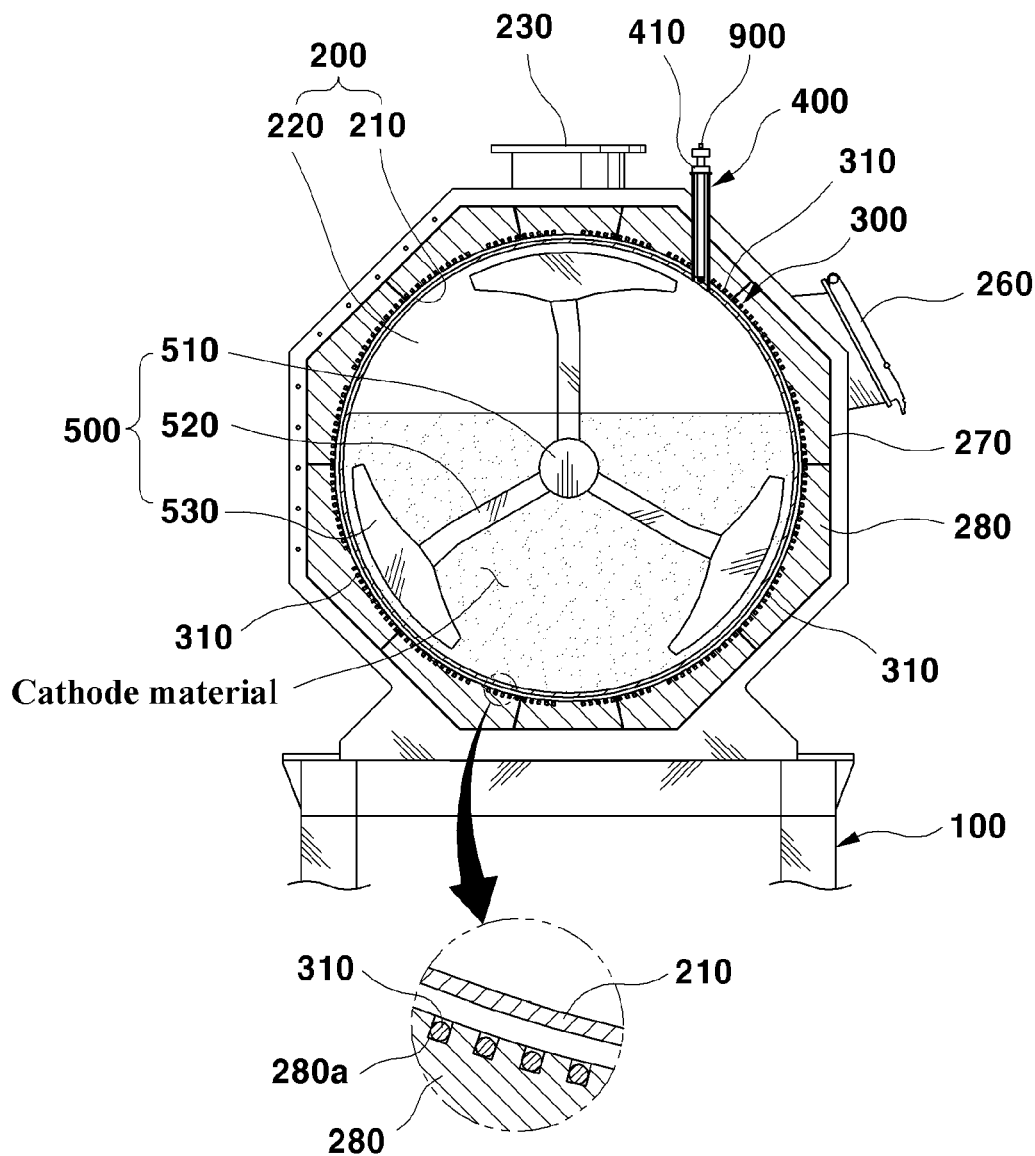

[FIG.5]
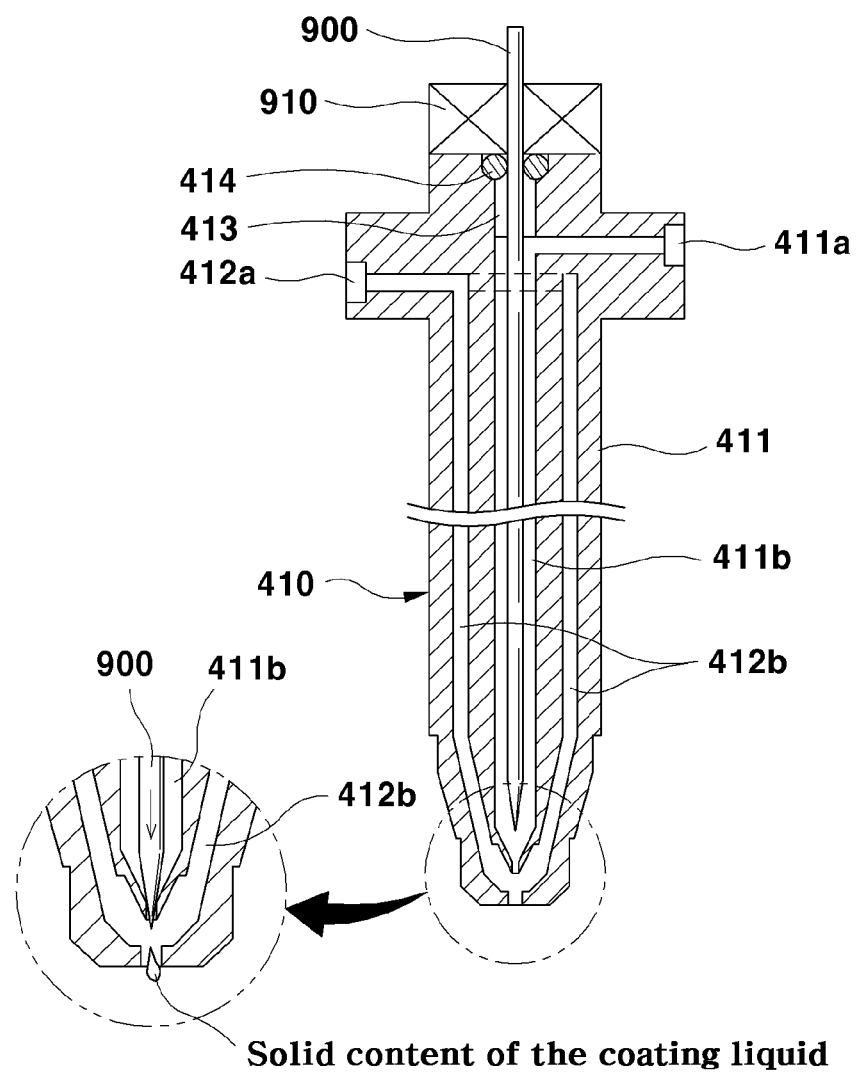

[FIG.6]
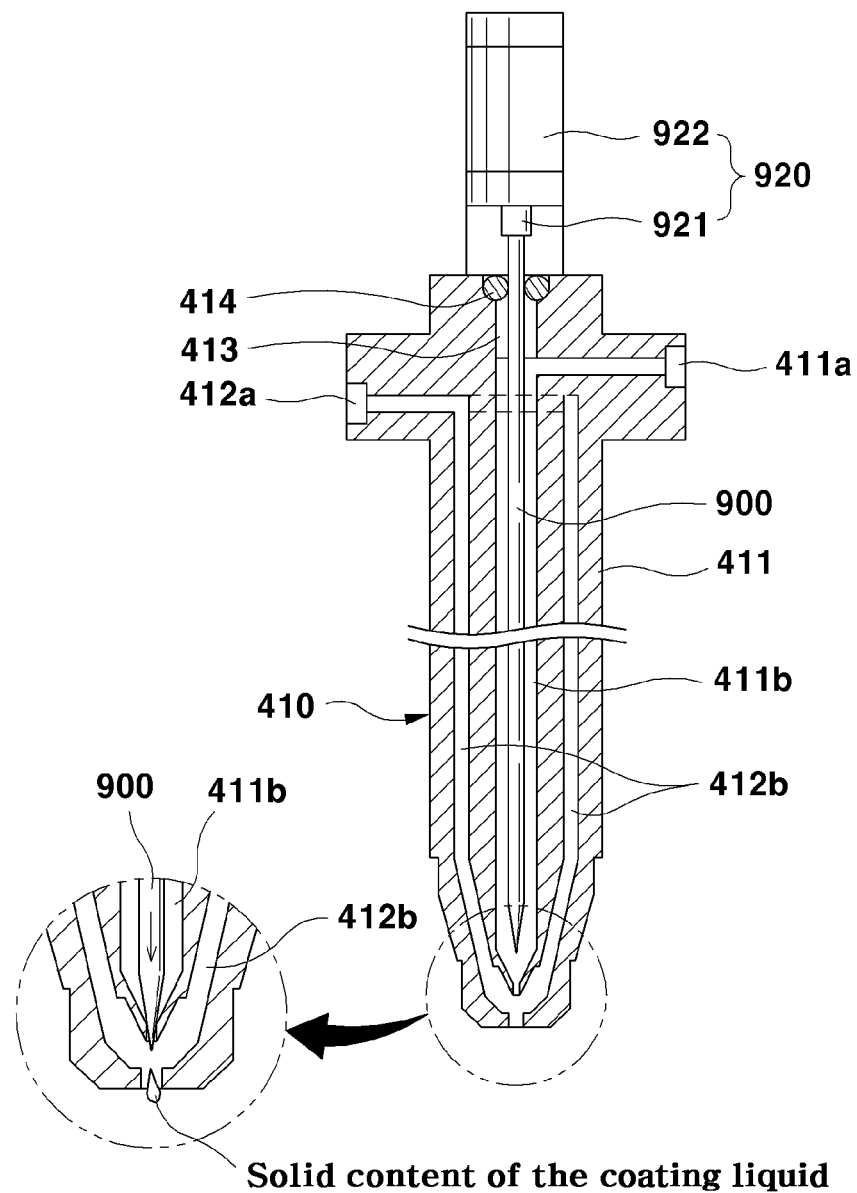
Solid content of the coating liquid

[FIG.7]
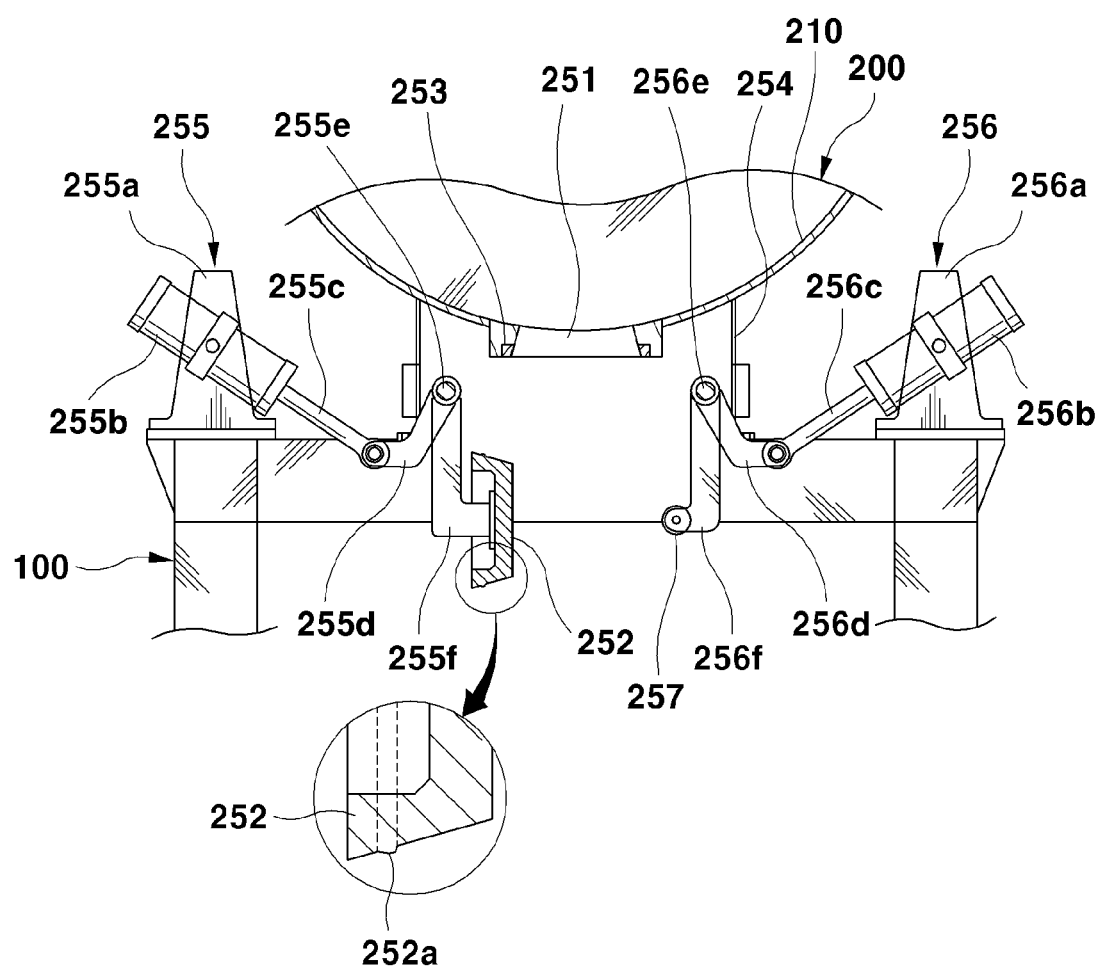

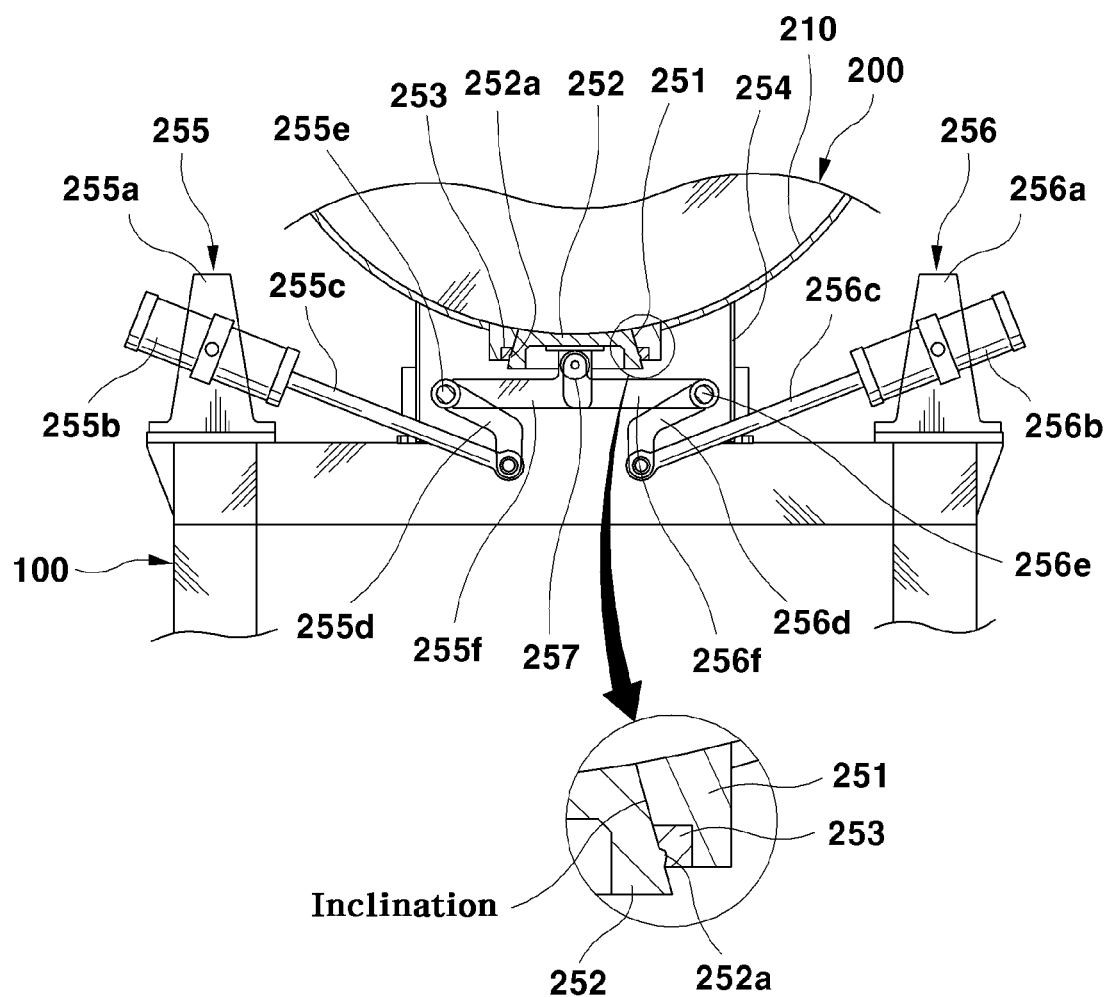
[FIG.8]

CATHODE MATERIAL INTEGRATED PROCESSING DEVICE

STATEMENT REGARDING GOVERNMENT SUPPORT

This research was supported by Development of Materials Components Technologies through Korea Evaluation Institute of Industrial Technology funded by Ministry of Trade, Industry and Energy. (Project No.: 20016080, Project name: Development of cathode material surface treatment technology and equipment with long-term stability at high temperature)

BACKGROUND OF THE INVENTION

1. Field of the Invention

The present invention relates to a cathode material integrated processing device, and more particularly, to a cathode material integrated processing device, in which processes of drying, applying, heat-treating a cathode material of a secondary battery are unified to maximize work efficiency, quality, and productivity according to manufacturing of the cathode material.

2. Description of the Related Art

In recent years, as mobile devices such as portable game consoles, portable phones (smart phones, etc.), and portable computers (laptop computers, tablet PCs, etc.) are widely distributed and used, demands for secondary batteries that are chargeable and dischargeable as power sources for mobile devices are rapidly increasing.

In addition, in order to be commercially applicable to electric vehicles (EVs), energy storage systems (ESSs), etc., research and development for improving performance and manufacturability of secondary batteries are being actively conducted.

In general, a secondary battery includes a cathode material, an anode material, an electrolyte, and a separator.

Among them, the cathode material is an important factor for determining performance (capacity, output, etc.) of the secondary battery.

Representative examples of the cathode material of the secondary battery include $LiCoO_2$ (LCO), $LiNiCoMnO_2$ (NCM), $LiNiCoAlO_2$ (NCA), $LiFePO_4$ (LFP), and the like.

As illustrated in FIG. 1, the cathode materials have to be subjected to each of washing, dehydration, drying, coating, heat treatment, and cooling processes to prevent quality of the cathode material from being deteriorated and improve intrinsic characteristics of the cathode material.

In addition, in the process of manufacturing the cathode material, a conventional cathode material drying device used in the drying process is disclosed in detail in Korean Patent Registration No. 10-1777977.

The conventional cathode material drying device is constituted by a drying furnace, a stirring device that stirs raw metal powder in the drying furnace, a heating/cooling chamber that is disposed around drying furnace to heat or cool the drying furnace while being isolated from the drying furnace, a steam device that supplies steam or cold air to the heating/cooling chamber, and a bag filter provided at the other side of a cooling device drying furnace to drop down the raw metal powder again into the drying furnace while discharging air and moisture, and thus, the cathode material is dried by heating the drying furnace through the steam supplied from the steam device to a pipe.

However, in the conventional cathode material drying device, since the steam or thermal oil is heated and transferred to the drying furnace through the pipe, a heat loss is high, and a temperature control is not easy.

In addition, since the conventional cathode material drying device only dries the cathode material and does not perform the coating and heat treatment processes. As a result, a separate coating and heat treatment device are required to complete the cathode material.

That is, in the conventional cathode material drying device, when adding a heat treatment function, it is not easy to heat the steam or heat transfer oil to a high-temperature heat capable of the heat treatment, and a severe partial temperature deviation occurs in the drying furnace, and thus, it is inappropriate to add the heat treatment function.

In addition, in the conventional cathode material drying device, since the cathode material has to be transferred to the coating and heat treatment devices after drying the cathode material, it takes a lot of time during the transfer process, and impurities may be mixed in the cathode material.

In addition, since the conventional cathode material drying device has a complicated structure due to the installation of pipes and a boiler, the structure is complex, and there are many difficulties in maintenance. The heat transfer oil used in the conventional cathode material drying device has a risk of explosion due to oil vapor and acts as a factor that causes environmental pollution.

Considering the above limitations, in the manufacturing of the cathode material according to the related art, it is difficult to improve work efficiency and quality and increase in productivity and safety.

Prior Art Document

Patent Document (Patent Document 1) Korean Patent Registration No. 10-1777977

SUMMARY OF THE INVENTION

The invention is intended to provide a cathode material integrated processing device, which is capable of providing high-temperature heat, has no temperature deviation and heat loss, and is capable of easily controlling a temperature to not only dry a cathode material and but also perform coating and heat treatment, thereby improving work efficiency, quality, and productivity according to manufacturing of the cathode material.

The invention is also intended to provide a cathode material integrated processing device in which an explosive element is removed in advance to improve safety.

The invention is also intended to provide an eco-friendly cathode material integrated processing device which is capable of drying and heat-treating a cathode material without using heat transfer oil that causes environmental pollution.

According to an embodiment of the invention, there is provided a cathode material integrated processing device including: a support frame; a chamber part including a cylindrical body configured to accommodate the cathode material and a thick plate coupled to each of both ends of the cylindrical body to seal both the ends of the cylindrical body and configured to fix the cylindrical body to an upper portion of the support frame; a heating part disposed in close proximity to each of the outside of the cylindrical body and the outside of the thick plate of the chamber part to heat the chamber part; a spray part including one or more nozzles, which is disposed between an upper portion and one side of the cylindrical body of the chamber part and is inserted in the cylindrical body to spray a coating liquid to the cathode material within the chamber part through a gas; a stirring part rotatably disposed inside the cylindrical body of the chamber part to stir the cathode material within the chamber part; a driving part connected to one side of the stirring part and rotatably disposed at one side of an upper portion of the support frame to rotate the stirring part; and a control part configured to control the heating part, the spray part, and the driving part.

According to one aspect, the chamber part may further includes: an input part disposed on an upper portion of one side of the cylindrical body to input the cathode material into the chamber part; an exhaust part disposed on an upper portion of the other side of the cylindrical body to discharge moisture within the chamber part to the outside; a discharge part disposed on a lower portion of the cylindrical body to discharge the cathode material to the outside of the chamber part; and a manhole part disposed at one side of the cylindrical body to be accessible for maintenance and cleaning inside the chamber part.

According to one aspect, the chamber part may further include: a housing provided to surround an outer surface of the cylindrical body and to be spaced apart from the outer surface of the cylindrical body so as to cover the cylindrical body; and a refractory block interposed between the housing and the cylindrical body to prevent heat from being dissipated.

According to one aspect, the heating part may include an electric heating wire.

According to one aspect, the nozzle may include: a body inserted into the cylindrical body; a first inlet penetrated into the inside of the body to introduce the coating liquid therein at one side of a rear end of the body; a second inlet penetrated into the body to introduce the gas therein at the other side of a rear end of the body; a first passage, which is penetrated in a longitudinal direction of the body and is connected to the first inlet to induce and spray the coating liquid to a front end of the body, and a second passage, which is penetrated in the longitudinal direction of the body outside the inside of the body and is connected to the second inlet to induce and spray the gas to the front end of the body.

According to one aspect, the stirring part may include: a stirring rotation shaft inserted into the cylindrical body and having one end and the other end, which are rotatably supported inside the thick plate; one or more connection rods having one end fixed to a circumference of the stirring rotation shaft to protruding radially; and a blade fixed to the other end of the connection rod to stir the cathode material.

According to one aspect, the driving part may include: a motor fixed to an upper portion of the support frame; a reducer connected to the motor; a first sprocket connected to the reducer; a second sprocket fixed to one end of the stirring rotation shaft; and a chain connected to the first sprocket and the second sprocket.

According to one aspect, the discharge part may include: an outlet having an upper end connected to a lower portion of the cylindrical body and an inner circumference inclined so that an upper side thereof is narrowed; an outlet cover having an outer circumference, of which an upper side is inclined to be narrowed so as to correspond to the outlet, to open and close the outlet; a packing inserted into a circumference of a front end of the outlet to seal a gap between the outlet and the outlet cover; an outlet passage provided to surround an outer circumference of the outlet on a bottom surface of the cylindrical body to guide the discharge of the cathode material; an outlet cover opening/closing unit disposed at one side of the upper portion of the support frame to open and close the outlet cover; and an outlet cover locking unit disposed at the other side of the upper portion of the support frame to lock the outlet cover that closes the outlet.

According to one aspect, the outlet cover opening/closing unit may include: a first bracket fixed to one side of the upper portion of the support frame; a first cylinder member that is coupled to the first bracket to rotate vertically and includes a first piston rod, which is extended and contracted in the longitudinal direction, at one end thereof; a first link having one end connected to an end of the first piston rod to convert linear motion into rotational motion; a first rotation shaft having one end connected to the other end of the first link and having an inner side passing through one side of the outlet passage; and a first support piece having one end connected to the inside of the first rotation shaft and the other end fixed to a lower portion of the outlet cover to rotate the outlet cover in a vertical direction.

According to one aspect, the outlet cover locking unit may include: a second bracket fixed to the other side of the upper portion of the support frame; a second cylinder member that is coupled to the second bracket to rotate vertically and includes a second piston rod, which is extended and contracted in the longitudinal direction, at one end thereof; a second link having one end connected to an end of the second piston rod to convert linear motion into rotational motion; a second rotation shaft having one end connected to the other end of the second link and having an inner side passing through the other side of the outlet passage; and a second support piece having one end connected to the inside of the second rotation shaft and the other end, which closes the outlet, to support a lower portion of the outlet cover.

According to one aspect, the cathode material integrated processing device may further include a pressing protrusion configured to press the packing, which is expanded by heat, so as to prevent the packing from being deformed.

According to one aspect, the cathode material integrated processing device may further include a roller rotatably fixed to the other end of the second support piece.

According to one aspect, the stirring part may further include a sensor part that is adjacent to the stirring part and connected to the control part to operate the spray part according to rotation of the stirring part. According to one aspect, the sensor part may include a photosensor configured to detect the number of revolutions of the stirring part.

According to one aspect, the cathode material integrated processing device may further include a needle inserted into the first passage to slidably move so as to remove a solid content of the coating liquid adhered to the front end of the nozzle.

According to one aspect, the cathode material integrated processing device may further include: a through-hole penetrated to be connected to the first passage so that the needle is inserted; and a sealing inserted into a circumference of the through-hole to seal a gap between the through-hole and the needle.

According to one aspect, the cathode material integrated processing device may further include a clamp configured to fix the needle at a rear side of the nozzle. According to one aspect, the cathode material integrated processing device may further include a moving unit configured to automatically reciprocate the needle at the rear side of the nozzle.

According to one aspect, the moving unit may include: a third piston rod, to which one end of a rear end of the needle is connected; and a third cylinder member inserted into the other end of the third piston rod so that the third piston rod is extended and contracted in the longitudinal direction.

BRIEF DESCRIPTION OF THE DRAWINGS

FIG. 1 is a view illustrating a process of manufacturing a cathode martial according to a related art.

FIG. 2 is a front view illustrating of a cathode material integrated processing device according to an embodiment of the invention.

FIG. 3 is a side view illustrating the cathode material integrated processing device according to an embodiment of the invention.

FIG. 4 is a side cross-sectional view illustrating the cathode material integrated processing device according to an embodiment of the invention.

FIGS. 5 and 6 are views illustrating a nozzle in a spray part of the cathode material integrated processing device according to an embodiment of the invention.

FIGS. 7 and 8 are views illustrating a discharge part of the cathode material integrated processing device according to an embodiment of the invention.

DETAILED DESCRIPTION OF THE EXEMPLARY EMBODIMENTS

Hereinafter, embodiments of the cathode material integrated processing device according to the invention will be described in more detail based on the accompanying drawings.

Here, components having the same function in all the drawings below use the same reference numerals, and repetitive descriptions are omitted. Furthermore, the terms to be described later are defined in consideration of the functions in the invention, which are unique and commonly used. should be interpreted in meaning. In addition, in the following description of the invention, if it is determined that a detailed description of the related known function or configuration may unnecessarily obscure the subject substance of the invention, the detailed description thereof will be omitted. Furthermore, when it is described that one includes some elements, it should be understood that it may include only those elements, or it may include other elements as well as those elements if there is no specific limitation.

FIG. 2 is a front view illustrating of a cathode material integrated processing device according to an embodiment of the invention, FIG. 3 is a side view illustrating the cathode material integrated processing device according to an embodiment of the invention, FIG. 4 is a side cross-sectional view illustrating the cathode material integrated processing device according to an embodiment of the invention, FIGS. 5 and 6 are views illustrating a nozzle in a spray part of the cathode material integrated processing device according to an embodiment of the invention, and FIGS. 7 and 8 are views illustrating a discharge part of the cathode material integrated processing device according to an embodiment of the invention.

As illustrated in the drawings, in the cathode material integrated processing device 1 according to an embodiment of the invention, a support frame 100 is disposed on a lower portion.

A cylindrical body 210 for accommodating a cathode material and a chamber part 200 including a thick plate 220 coupled to each of both ends of the cylindrical body 210 to seal both the ends of the cylindrical body 210 and configured to fix the cylindrical body 210 to an upper portion of the support frame 100 are disposed on the upper portion of the support frame 100.

A heating part 300 for heating the chamber part 200 is disposed in close proximity to each of the outside the cylindrical body 210 and the outside the thick plate 220 of the chamber part 200.

Each of the heating parts 300 is provided as an electric heating wire 310 that is heated by electricity. A spray part 400 including one or more nozzles 410 inserted in a longitudinal direction of the cylindrical body 210 to spray a coating liquid to the cathode material within the chamber part 200 through a gas is disposed between the upper portion and one side of the cylindrical body 210 of the chamber part 200.

A stirring part 500 for stirring the cathode material within the chamber part 200 is rotatably disposed inside the cylindrical body 210 of the chamber part 200. A driving part 600 rotatably disposed at one side of the upper portion of the support frame 100 to rotate the stirring part 500 is disposed at one side of the stirring part 500.

A control part 700 for controlling the heating part 300, the spray part 400, and the driving part 600 is disposed on the support frame 100.

In addition, in the chamber part 200, an input part 230 for inputting the cathode material into the chamber part 200 is disposed on an upper portion of one side of the cylindrical body 210.

An exhaust part 240 for discharging moisture within the chamber part 200 to the outside is disposed on an upper portion of the other side of the cylindrical body 210.

A discharge part 250 for discharging the cathode material to the outside of the chamber part 200 is disposed on a lower portion of the cylindrical body 210. A manhole part 260 that is accessible for maintenance and cleaning inside the chamber part 200 is disposed at one side of the cylindrical body 210.

A housing 270, which is provided to surround an outer surface of the cylindrical body 210 and to be spaced apart from the outer surface of the cylindrical body 210 so as to cover the cylindrical body 210, and a refractory block 280, which is interposed between the housing 270 and the cylindrical body 210 to prevent heat from being dissipated, are disposed in the chamber part 200.

Accommodation grooves 280a recessed in a longitudinal direction of the cylindrical body to accommodate an electric heating wire 310 of the heating part 300 is defined at predetermined intervals in an inner surface of the refractory block 280.

In addition, the nozzle 410 includes a body 411 inserted into the cylindrical body 210, a first inlet 411a penetrated into the inside of the body 411 to introduce the coating liquid therein at one side of a rear end of the body 411, and a second inlet 412a penetrated into the body 411 to introduce a gas therein at the other side of a rear end of the body 411.

A first passage 411b, which is penetrated in the longitudinal direction of the body 411 and is connected to the first inlet 411a to induce and spray the coating liquid to a front end of the body 411, and a second passage 412b, which is penetrated in the longitudinal direction of the body 411 outside the inside of the body 411 and is connected to the second inlet 412a to induce and spray the gas to the front end of the body 411, are disposed outside the inside of the body 411.

In addition, a needle 900 inserted into the first passage 411b to slidably move so as to remove a solid content of the coating liquid adhered to the front end of the nozzle 410 is disposed on the nozzle 410.

In order to insert the needle 900, a through-hole 413, which is penetrated to be connected to the first passage 411b so that the needle 900 is inserted, and a sealing 414, which is inserted into a circumference of the through-hole 413 to seal a gap between the through-hole 413 and the needle 900, are disposed at the rear end of the nozzle 410.

A clamp 910 for fixing the needle 900 is also disposed at a rear side of the nozzle 410.

In addition, a moving unit 920 for automatically reciprocating the needle 900 may be disposed at the rear side of the nozzle 410, and the moving unit 920 may be provided with a third piston rod 921, to which one end of a rear end of the needle 900 is connected, and a third cylinder member 922, which is inserted into the other end of the third piston rod 921 so that the third piston rod 921 is extended and contracted in the longitudinal direction.

A hydraulic pressure or pneumatic pressure is provided to the third cylinder member 922 so that the third piston rod 921 operates to be extended and contracted in the longitudinal direction by the hydraulic pressure or pneumatic pressure.

In addition, the stirring part 500 includes a stirring rotation shaft 510 inserted into the cylindrical body 210 and having one end and the other end, which are rotatably supported inside the thick plate 220, one or more connection rods 520 having one end fixed to a circumference of the stirring rotation shaft 510 to protruding radially, and a blade 530 fixed to the other end of the connection rod 520 to stir the cathode material.

In addition, the driving part 600 includes a motor 610 fixed to an upper portion of the support frame 100, a reducer 620 connected to the motor 610, a first sprocket 630 connected to the reducer 620, a second sprocket 640 fixed to one end of the stirring rotation shaft 510, and a chain 650 connected to the first sprocket 630 and the second sprocket 640.

In addition, the discharge part 250 includes an outlet 251 having an upper end connected to a lower portion of the cylindrical body 210 and an inner circumference inclined so that an upper side thereof is narrowed, an outlet cover 252 having an outer circumference, of which an upper side is inclined to be narrowed so as to correspond to the outlet 251, to open and close the outlet 251, a packing 253 inserted into a circumference of a front end of the outlet 251 to seal a gap between the outlet 251 and the outlet cover 252, an outlet passage 254 provided to surround an outer circumference of the outlet 251 on a bottom surface of the cylindrical body 210 to guide the discharge of the cathode material, an outlet cover opening/closing unit 255 disposed at one side of the upper portion of the support frame 100 to open and close the outlet cover 252, and an outlet cover locking unit 256 disposed at the other side of the upper portion of the support frame 100 to lock the outlet cover 252 that closes the outlet 251.

The outlet cover opening/closing unit 255 includes a first bracket 255a fixed to one side of the upper portion of the support frame 100, a first cylinder member 255b that is coupled to the first bracket 255a to rotate vertically and includes a first piston rod 255c, which is extended and contracted in the longitudinal direction, at one end thereof, a first link 255d having one end connected to an end of the first piston rod 255c to convert linear motion into rotational motion, a first rotation shaft 255e having one end connected to the other end of the first link 255d and having an inner side passing through one side of the outlet passage 254, and a first support piece 255f having one end connected to the inside of the first rotation shaft 255e and the other end fixed to a lower portion of the outlet cover 252 to rotate the outlet cover 252 in the vertical direction.

The outlet cover locking unit 256 includes a second bracket 256a fixed to the other side of the upper portion of the support frame 100, a second cylinder member 256b that is coupled to the second bracket 256a to rotate vertically and includes a second piston rod 256c, which is extended and contracted in the longitudinal direction, at one end thereof, a second link 256d having one end connected to an end of the second piston rod 256c to convert linear motion into rotational motion, a second rotation shaft 256e having one end connected to the other end of the second link 256d and having an inner side passing through the other side of the outlet passage 254, and a second support piece 256f having one end connected to the inside of the second rotation shaft 256e and the other end, which closes the outlet 251, to support a lower portion of the outlet cover 252.

In addition, a pressing protrusion 252a that presses the packing 253, which is expanded by heat, to prevent the packing 253 from being deformed protrudes from an outer circumference of the outlet cover 252.

A roller 257 is rotatably fixed to the other end of the second support piece 256f.

The hydraulic pressure or pneumatic pressure is provided to the first cylinder member 255b and the second cylinder member 256b so that the first piston rod 255c and the second piston rod 256c operate to be extended and contracted in length.

In addition, a sensor part 800 adjacent to the stirring part 500 and connected to the control part 700 to operate the spray part 400 according to rotation of the stirring part 500 is disposed on the stirring part 500.

The sensor part 800 may be a photosensor that detects the number of revolutions of the stirring part 500. An operation of the cathode material integrated processing device according to an embodiment of the invention, which is configured as described above, will be described.

As illustrated in FIGS. 2 to 4, when the cathode material within the chamber part 200 is stirred using the stirring part 500 while the cleaned cathode material is put into the chamber part 200 through an input part 230 and is heated so that the chamber 200 has an internal temperature of about 100° C. to about 180° C. through the heating part 300, the cathode material is dried.

In addition, when the drying of the cathode material is completed, while the stirring part 500 stirs the cathode material, the spray part 400 sprays the coating liquid to the cathode material through the nozzle 410, and heat treatment is performed to apply the cathode material.

The heat treatment is performed while the chamber part 200 is heated at a high-temperature heat so that the chamber has an internal temperature of about 300° C. to about 600° C.

Thereafter, when the applying of the cathode material is completed, the cathode material is cooled and then discharged through the discharge part 250 to the outside, thereby completing the manufacturing of the cathode material.

That is, as the heating part 300 is provided as the electric heating wire 310 to directly heat the chamber part 200, there is no temperature deviation and heat loss inside the chamber part 200, and high-temperature heat at which the heat treatment is capable of being performed may be provided inside the chamber part 200.

Although the spray part 400 is not shown in the drawings, the nozzle 410 may be connected to each of a coating liquid supply part and a gas supply part, and thus, the nozzle 410 may spray the coating liquid to the cathode material inside the chamber part 200 through a gas so that the cathode material is coated with the coating liquid.

When the stirring rotation shaft 510 connected to the driving part 600 rotates, a blade connected to the stirring rotation shaft 510 through the connection rod 520 may rotate inside the chamber part 200 to homogenize the cathode material. Thus, the invention may efficiently perform the drying, coating, and heat treatment processes of the cathode material through the stirring part 500.

As illustrated in FIG. 2, in an operation of the driving part 600, when the motor 610 rotates by the control part 700, rotational force of the motor 610 is transmitted to the reducer 620, and the rotational force of the reducer 620 is transmitted to the stirring rotation shaft 510 of the stirring part 500 through the first sprocket 630, the chain 650, and the second sprocket 640, and thus, the blade 530 connected to the stirring rotation shaft 510 through the connection rod 520 rotates inside the chamber part 200.

In addition, as the needle 900 is inserted into the nozzle 410, the solid content of the coating liquid adhered to the front end of the nozzle 410 may be easily removed without disassembling the nozzle 410.

Referring to FIG. 5, when the coating liquid is not sprayed by blocking the nozzle 410 due to the solid content of the coating liquid adhered to the front end of the nozzle 410, the locking of the clamp 910 fixing the needle 900 is unlocked, and the needle 900 is advanced and pushed into the nozzle 410 so that a pointed end of the needle 900 presses the solid content of the coating liquid.

Therefore, the solid content of the fixed coating liquid is pushed out of the nozzle 410 and removed while being decomposed by the pressure of the pointed end of the needle 900.

When the needle 900 is not in use, the needle 900 retreats to the outside of the rear end of the nozzle 410 and then fixed through the clamp 910 disposed at the rear end of the nozzle 410, and thus, the movement of the needle 900 is stopped.

In addition, referring to FIG. 6, the moving unit 920 may be provided at the rear end of the nozzle 410 to automatically easily remove the solid content of the coating liquid adhered to the front end of the nozzle 410.

That is, if the coating liquid is not sprayed because the solid content of the coating liquid is adhered to the front end of the nozzle 410 to block the nozzle 410, the third piston rod 921 of the third cylinder member 922, which is the moving unit 920, is extended in length, and thus, the needle 900 connected to the third piston rod 911 moves forward, and the pointed end of the needle 900, which moves forward, presses the solid content of the coating liquid.

Therefore, the solid content of the fixed coating liquid is pushed out of the nozzle 410 and removed while being decomposed by the pressure of the pointed end of the needle 900.

Then, when the solid content of the coating liquid is removed, the third piston rod 921 is inserted into the third cylinder member 922, and the needle 900 retreats toward the rear end of the nozzle 410.

As illustrated in FIGS. 7 and 8, in the discharge part 250, since an inner circumference of the outlet 251 and an outer circumference of the outlet cover 252 are inclined so that the upper side thereof is narrowed, when the outlet cover 252 is closed, the airtightness between the outlet 251 and the outlet cover 252 is further improved than when the circumference is provided in a straight line.

In addition, as the pressing protrusion 252*a* is disposed on the outer circumference of the outlet cover 252, the pressing protrusion 252*a* may press the heat-expandable packing 253 into the outlet 251 to prevent the packing from being expanded, thereby preventing the packing 253, which seals the gap between the outlet 251 and the outlet cover 252, from being deformed.

In addition, in the operation of the outlet cover opening/closing unit 255, when the first piston rod 255*c* of the first cylinder member 255*b* is extended or contracted in length, the first link 255*d* converts the linear motion into the rotational motion to rotate the first rotation shaft 255*e*, and the first support piece 255*f* connected to the inside of the first rotation shaft 255*e* rotates the outlet cover 252 in the vertical direction so that the outlet cover 252 opens and closes the outlet 251.

In addition, in the operation of the outlet cover locking unit 256, when the second piston rod 256*c* of the second cylinder member 256*b* is extended or contracted in length, the second link 256*d* converts the linear motion into the rotational motion to rotate the second rotation shaft 256*e*, and the second support piece 256*f* connected to the inside of the second rotation shaft 256*e* supports the lower portion of the outlet cover 252 that closes the outlet 251 so that the outlet cover 252 is locked.

Here, as a bottom surface of the outlet cover 252 is supported by the roller 257 disposed at the other end of the second support piece 256*f*, scratches do not occur on the bottom surface of the outlet cover 252.

The first cylinder member 255*b* and the second cylinder member 256*b* respectively disposed in the outlet cover opening/closing unit 255 and the outlet cover locking unit 256 are not fixed to the chamber 200, but the support frame 100 spaced apart from the heating part 300 is installed to prevent the first cylinder member 255*b* and the second cylinder member 256*b* from being broken down by the high-temperature heat.

That is, when the first cylinder member 255*b* and the second cylinder member 256*b* are installed in the chamber 200, the high-temperature heat for heat-treating the cathode material is directly transferred from the chamber 200 to the first cylinder member 255*b* and the second cylinder member 256*b*.

Thus, even though the first piston rod 255*c* and the second piston rod 256*c* are deformed, or the sealed portion is expanded due to the heat to deteriorate the sealing function, the support frame 100, in which the first cylinder member 255*b* and the second cylinder member 256*b* are separated from the chamber part 200, may be installed, and thus, the high-temperature heat of the chamber part 200 may not be transferred to the first cylinder member 255*b* and the second cylinder member 256*b* to prevent the first cylinder member 255*b* and the second cylinder member 256*b* from being broken down due to heat.

In addition, as illustrated in FIG. 2, when the sensor part 800 measures the number of revolutions of the driving part 600 to transmit the result to the control part 700, the control part 700 may accurately grasp the position of the blade 530 of the stirring part 500, and thus, the control part 700 may adjust the timing of spraying the coating liquid onto the cathode material through the sensor part 800.

Therefore, the invention may maximize the work efficiency, the quality, and the productivity of the cathode material because the processes of the drying, the coating, and the heat treatment of the cathode material are unified. Due to the above-described configuration, the cathode material integrated processing device according to the invention may perform the drying, coating, and heat treatment processes through one device to improve the work efficiency, the quality, and the productivity according to the manufacturing of the cathode material.

That is, as the heating part is provided as the electric heating wire to heat the entire chamber part, the electric heating wire may provide the high-temperature heat to the inside of the chamber part, and as there is no temperature deviation and heat loss, and the temperature control is easy, the invention may effectively perform the drying or heat treatment process of the cathode material through the heating part.

In addition, since the conventional heat transfer oil is replaced with the electric heating wire in the heating part, the explosion accident due to the oil vapor may be prevented in advance, and the environmental pollution may not occur.

In addition, as the spray part sprays the coating liquid onto the cathode material inside the chamber part, the invention may effectively perform the coating process of the cathode material through the spray part.

In addition, when the cathode material is dried, applied, and heat-treated through the stirring part, the cathode material may be homogenized.

In addition, as the needle is inserted into the nozzle of the spray part, the solid content of the coating liquid adhered to the front end of the nozzle may be easily removed without disassembling the nozzle.

In addition, the position of the blades of the stirring part may be accurately grasped through the sensor part to adjust the timing of spraying the coating liquid onto the cathode material.

In addition, since the structure is simple, the installation and disassembly may be easy, and the time and cost associated with the maintenance may be saved.

What is claimed is:

1. A cathode material integrated processing device, which dries, applies, and heat-treats a cathode material, the cathode material integrated processing device comprising:
   a support frame;
   a chamber part comprising a cylindrical body configured to accommodate the cathode material and a plate coupled to each of both ends of the cylindrical body to seal both the ends of the cylindrical body and configured to fix the cylindrical body to an upper portion of the support frame;
   a heating part disposed in close proximity to each of an outside of the cylindrical body and an outside of the plate of the chamber part to heat the chamber part;
   a spray part comprising one or more nozzles, which is disposed between an upper portion and one side of the cylindrical body of the chamber part and is inserted in the cylindrical body to spray a coating liquid to the cathode material within the chamber part through a gas;
   a stirring part rotatably disposed inside the cylindrical body of the chamber part to stir the cathode material within the chamber part;
   a driving part connected to one side of the stirring part and rotatably disposed at one side of an upper portion of the support frame to rotate the stirring part; and
   a control part configured to control the heating part, the spray part, and the driving part, wherein the one or more nozzles comprises:
   a body inserted into the cylindrical body;
   a first inlet penetrated into an inside of the body to introduce the coating liquid therein at one side of a rear end of the body;
   a second inlet penetrated into the inside of the body to introduce the gas therein at another side of the rear end of the body;
   a first passage, which is penetrated in a longitudinal direction of the body and is connected to the first inlet to induce and spray the coating liquid to a front end of the body, and
   a second passage, which is penetrated in the longitudinal direction of the body and is connected to the second inlet to induce and spray the gas to the front end of the body;
   wherein the chamber part further comprises:
   an input part disposed on an upper portion of one side of the cylindrical body to input the cathode material into the chamber part;
   an exhaust part disposed on the upper portion of another side of the cylindrical body to discharge moisture within the chamber part to outside of the chamber part;
   a discharge part disposed on a lower portion of the cylindrical body to discharge the cathode material to the outside of the chamber part; and
   a manhole part disposed at one side of the cylindrical body to be accessible for maintenance and cleaning inside the chamber part; and
   wherein the discharge part comprises:
   an outlet having an upper end connected to a lower portion of the cylindrical body and an inner circumference inclined so that an upper side thereof is narrowed;
   an outlet cover having an outer circumference, of which an upper side is inclined to be narrowed so as to correspond to the outlet, to open and close the outlet;
   a packing inserted into a circumference of a front end of the outlet to seal a gap between the outlet and the outlet cover;
   an outlet passage provided to surround an outer circumference of the outlet on a bottom surface of the cylindrical body to guide the discharge of the cathode material;
   an outlet cover opening/closing unit disposed at one side of the upper portion of the support frame to open and close the outlet cover; and
   an outlet cover locking unit disposed at another side of the upper portion of the support frame to lock the outlet cover that closes the outlet.

2. The cathode material integrated processing device according to claim 1, wherein the chamber part further comprises:
   a housing provided to surround an outer surface of the cylindrical body and to be spaced apart from the outer surface of the cylindrical body so as to cover the cylindrical body; and
   a refractory block interposed between the housing and the cylindrical body to prevent heat from being dissipated.

3. The cathode material integrated processing device according to claim 1, wherein the heating part comprises an electric heating wire.

4. The cathode material integrated processing device according to claim 1, wherein the stirring part comprises:
   a stirring rotation shaft inserted into the cylindrical body and having one end and another end, which are rotatably supported inside the plate;
   one or more connection rods having one end fixed to a circumference of the stirring rotation shaft to protruding radially; and a blade fixed to the other end of the connection rod to stir the cathode material.

5. The cathode material integrated processing device according to claim 4, wherein the driving part comprises:
a motor fixed to the upper portion of the support frame;
a reducer connected to the motor;
a first sprocket connected to the reducer;
a second sprocket fixed to one end of the stirring rotation shaft; and
a chain connected to the first sprocket and the second sprocket.

6. The cathode material integrated processing device according to claim 1, wherein the outlet cover opening/closing unit comprises:
a first bracket fixed to one side of the upper portion of the support frame;
a first cylinder member that is coupled to the first bracket to rotate vertically and comprises a first piston rod, which is extended and contracted in the longitudinal direction, at one end thereof;
a first link having one end connected to an end of the first piston rod to convert linear motion into rotational motion;
a first rotation shaft having one end connected to another end of the first link and having an inner side passing through one side of the outlet passage; and
a first support piece having one end connected to an inside of the first rotation shaft and another end fixed to a lower portion of the outlet cover to rotate the outlet cover in a vertical direction.

7. The cathode material integrated processing device according to claim 1, wherein the outlet cover locking unit comprises:
a second bracket fixed to another side of the upper portion of the support frame;
a second cylinder member that is coupled to the second bracket to rotate vertically and comprises a second piston rod, which is extended and contracted in the longitudinal direction, at one end thereof;
a second link having one end connected to an end of the second piston rod to convert linear motion into rotational motion;
a second rotation shaft having one end connected to another end of the second link and having an inner side passing through another side of the outlet passage; and
a second support piece having one end connected to the inside of the second rotation shaft and another end, which closes the outlet, to support a lower portion of the outlet cover.

8. The cathode material integrated processing device according to claim 1, further comprising a pressing protrusion configured to press the packing, which is expanded by heat, so as to prevent the packing from being deformed.

9. The cathode material integrated processing device according to claim 7, further comprising a roller rotatably fixed to another end of the second support piece.

10. The cathode material integrated processing device according to claim 1, wherein the stirring part further includes a sensor part that is adjacent to the stirring part and connected to the control part to operate the spray part according to rotation of the stirring part.

11. The cathode material integrated processing device according to claim 10, wherein the sensor part comprises a photosensor configured to detect a number of revolutions of the stirring part.

12. The cathode material integrated processing device according to claim 1, further comprising a needle inserted into the first passage to slidably move so as to remove a solid content of the coating liquid adhered to a front end of the one or more nozzles.

13. The cathode material integrated processing device according to claim 12, further comprising:
a through-hole penetrated to be connected to the first passage so that the needle is inserted; and
a sealing inserted into a circumference of the through-hole to seal a gap between the through-hole and the needle.

14. The cathode material integrated processing device according to claim 12, further comprising a clamp configured to fix the needle at a rear side of the one or more nozzles.

15. The cathode material integrated processing device according to claim 12, further comprising a moving unit configured to automatically reciprocate the needle at the rear side of the one or more nozzles.

16. The cathode material integrated processing device according to claim 15, wherein the moving unit comprises:
a third piston rod, to which one end of a rear end of the needle is connected; and
a third cylinder member inserted into another end of the third piston rod so that the third piston rod is extended and contracted in the longitudinal direction.

* * * * *